United States Patent
Cattoor et al.

(10) Patent No.: US 11,078,968 B2
(45) Date of Patent: Aug. 3, 2021

(54) WET CLUTCH ASSEMBLY

(71) Applicant: DANA BELGIUM N.V., Bruges (BE)

(72) Inventors: Kurt D M Cattoor, Bruges (BE); Filip D. Schacht, Meulebeke (BE)

(73) Assignee: Dana Belgium N.V., Bruges (BE)

( * ) Notice: Subject to any disclaimer, the term of this patent is extended or adjusted under 35 U.S.C. 154(b) by 68 days.

(21) Appl. No.: 16/472,068

(22) PCT Filed: Dec. 18, 2017

(86) PCT No.: PCT/EP2017/083391
§ 371 (c)(1),
(2) Date: Jun. 20, 2019

(87) PCT Pub. No.: WO2018/114853
PCT Pub. Date: Jun. 28, 2018

(65) Prior Publication Data
US 2020/0102989 A1     Apr. 2, 2020

(30) Foreign Application Priority Data

Dec. 22, 2016 (EP) .................................... 16206472

(51) Int. Cl.
*F16D 25/0638* (2006.01)
*F16D 48/02* (2006.01)

(52) U.S. Cl.
CPC ......... *F16D 25/0638* (2013.01); *F16D 25/14* (2013.01)

(58) Field of Classification Search
CPC .. F16D 25/0638; F16D 25/14; F16D 2125/06; F16D 2125/10; F16D 13/70
See application file for complete search history.

(56) References Cited

U.S. PATENT DOCUMENTS

| 2,721,640 | A | | 10/1955 | De Feo |
| 3,243,026 | A | * | 3/1966 | Black ..................... F16D 25/10 |
| | | | | 192/48.613 |
| 3,370,682 | A | | 2/1968 | McFarland |
| 4,266,648 | A | | 5/1981 | Martin |
| 4,442,929 | A | | 4/1984 | Uchida |
| 4,664,242 | A | * | 5/1987 | Downs .................. F16D 43/284 |
| | | | | 192/106 F |
| 5,651,288 | A | | 7/1997 | Meeusen |
| 6,098,771 | A | | 8/2000 | Vu |

(Continued)

FOREIGN PATENT DOCUMENTS

EP     1020655     7/2000

OTHER PUBLICATIONS

European Patent Office, International Search Report with Written Opinion issued in PCT/EP2017/083391, dated Feb. 28, 2018, 12 pages, Rijswijk Netherlands.

*Primary Examiner* — Ernesto A Suarez
*Assistant Examiner* — James J Taylor, II
(74) *Attorney, Agent, or Firm* — Marshall & Melhorn, LLC

(57) ABSTRACT

A wet clutch assembly may have a clutch drum, a clutch chamber formed within the clutch drum, a clutch actuation piston movably disposed within the clutch drum and configured to be actuated via a hydraulic pressure in the clutch chamber. A fluid line may at least partially extend through the clutch actuation piston, where the fluid line provides fluid communication with the clutch chamber for filling the clutch chamber via the fluid line.

8 Claims, 8 Drawing Sheets

(56) References Cited

U.S. PATENT DOCUMENTS

| | | | | |
|---|---|---|---|---|
| 6,112,874 | A * | 9/2000 | Kopp | F16D 25/02 |
| | | | | 192/35 |
| 6,206,163 | B1 | 3/2001 | Schneider | |
| 6,920,971 | B2 | 7/2005 | Creger | |
| 9,004,252 | B2 * | 4/2015 | AbuSamra | F16D 25/063 |
| | | | | 192/85.59 |
| 9,016,454 | B2 * | 4/2015 | Hemphill | F16D 25/0638 |
| | | | | 192/85.27 |
| 9,249,843 | B2 * | 2/2016 | Ari | F16D 48/02 |
| 10,746,234 | B2 * | 8/2020 | Fukuda | F16D 48/02 |
| 10,767,706 | B2 * | 9/2020 | Ishizaka | F16H 61/0265 |

* cited by examiner

WET CLUTCH ASSEMBLY

BACKGROUND

The invention relates primarily to a wet clutch assembly. Wet clutch assemblies of the presently described type may find application in transmissions for automotive vehicles, in particular in transmissions for off-highway vehicles such as mining vehicles, material handling vehicles and agricultural vehicles.

A wet clutch typically comprises a clutch drum forming a clutch chamber, a clutch pack disposed within the clutch drum and including a plurality of friction plates, and a clutch piston movably disposed within the clutch drum. By increasing a hydraulic pressure in the clutch chamber, the clutch piston may be actuated to force the friction plates into engagement to rotationally lock the clutch drum with a transmission shaft. During a shift, the amount of torque transmitted through the clutch is determined by the amount of fluid and the hydraulic pressure in the clutch chamber. That is, shift quality crucially depends on the precise control of the flow of fluid into or out of the clutch chamber at any instant during the shift.

It is known to control the flow of fluid into and out of the clutch chamber using one or more electronic control valves. However, electronic control valves tend to be costly and error prone. Furthermore, due to continual mechanical wear occurring during the lifetime of the clutch, the control and timing of the control valves requires frequent adjustment, thereby increasing operating costs.

Thus, the problem underlying the present invention consists in the design of a wet clutch system which may be produced and operated at preferably low costs and which allows preferably precise shift control over the lifetime of the clutch.

SUMMARY

This problem is solved by a wet clutch assembly according to claim 1. Special embodiments are described in the dependent claims.

The presently proposed wet clutch assembly comprises at least:
- a clutch drum;
- a clutch chamber formed within the clutch drum;
- a clutch actuation piston movably disposed within the clutch drum and configured to be actuated by means of a hydraulic pressure in the clutch chamber; and
- a fluid line at least partially extending through the clutch actuation piston, the fluid line providing fluid communication with the clutch chamber for filling the clutch chamber via the fluid line.

Precise control of the filling process of a wet clutch is essential for a smooth and efficient shift. The fact that according to the presently proposed wet clutch assembly the fluid line for filling the clutch chamber extends at least partially through the clutch actuation piston allows reducing the number of electronically controllable flow control valves to a minimum. Furthermore, flow control may be automatically adapted to wear of the clutch components. For example, the assembly may be configured in such a way that a cross section of the fluid line and an amount of fluid flowing into the clutch chamber may be automatically varied depending on a position of the clutch actuation piston relative to the clutch drum during a filling process. In this way, control of the filling process may be realized in a particularly simple, reliable and cost-effective manner.

The clutch drum may be rigidly coupled to or integrally formed with a first shaft or drum shaft. Usually, the wet clutch assembly further comprises a second shaft or clutch gear which may be selectively rotationally locked to the first shaft by means of the clutch actuation piston. That is, through movement of the clutch actuation piston, the wet clutch assembly may be transferred between an engaged state in which the first shaft and the second shaft are rotationally locked, and a disengaged state in which the first shaft and the second shaft are free to rotate relative to one another.

The fluid line may partially extend through the first shaft. For example, a first section of the fluid line may extend through the clutch actuation piston, and a second section of the fluid line may extend through the first shaft. The wet clutch assembly may then comprise sealing means arranged in between the clutch actuation piston and the first shaft, the sealing means forming a fluid feed through between the first fluid line section and the second fluid line section. The sealing means may be mounted on the clutch actuation piston and/or on the first shaft and may provide sliding sealing engagement between the clutch actuation piston and the first shaft.

The wet clutch assembly may comprise a fluid reservoir, and the clutch chamber may be in fluid communication with the fluid reservoir via fluid line. Usually, the wet clutch assembly further comprises a pressurizing device for delivering a clutch fluid such as oil from the fluid reservoir to the clutch chamber via the fluid line. For example, the pressurizing device may comprise a fluid pump or a hydraulic cylinder including a further piston. The pressurizing device is preferably configured to deliver the clutch fluid ata hydraulic pressure which is sufficient for actuating the clutch actuation piston. The fluid line may further be in fluid communication with a fluid drain for draining clutch fluid from the clutch chamber to the fluid drain. That is, the fluid line may be configured to be used for both filling and de-filling or draining the clutch chamber. The fluid drain may be in fluid communication with the fluid reservoir. In some embodiments the fluid reservoir may function as the fluid drain.

Usually, the wet clutch assembly further comprises a clutch pack comprising a plurality of friction plates. The clutch actuation piston may then be configured to transfer the wet clutch assembly to the above-described engaged state by forcing the friction plates into engagement. For example, the friction plates may comprise a plurality of first plates and a plurality of second plates. The first plates and the second plates may be arranged alternately such that each of the first plates is arranged in between two of the second plates, and such that each of the second plates is arranged in between two of the first plates. Engaging the friction plates may then include frictionally engaging the first plates with the second plates.

The first plates may be coupled to the clutch drum, and the second plates may be coupled to the second shaft or clutch gear. Typically, the first plates are slidably disposed relative to the clutch drum along or in parallel to an axis of rotation of the clutch drum and are rotationally locked to the clutch drum such that the clutch drum and the first plates rotate together with respect to the axis of rotation of the clutch drum. Similarly, the second plates may be slidably disposed relative to the second shaft or clutch gear along or in parallel to an axis of rotation of the second shaft which is aligned in parallel to the axis of rotation of the clutch drum, and the second plates may be rotationally locked to the second shaft such that the second shaft and the second plates rotate together with respect to the axis of rotation of the second shaft.

The wet clutch assembly may further comprise a flow control member movable relative to a section of the fluid line. For example, the flow control member may be movable relative to the above-described first fluid line section extending through the clutch actuation piston, or the flow control member may be movable relative to the above-described second fluid line section extending through the first shaft or drum shaft. In particular, the flow control member may be configured to vary a cross section of said fluid line section through movement of the clutch actuation piston relative to the clutch drum.

For example, the clutch actuation piston may be configured to transfer the wet clutch assembly from the disengaged state to the engaged state through movement of the clutch actuation piston in an engagement direction relative to the clutch drum. The flow control member may then be configured to reduce the cross section of said fluid line section through movement of the clutch actuation piston in the engagement direction. In this way, the flow of fluid into the clutch chamber may be reduced as the clutch actuation piston moves in the engagement direction.

For example, the fluid line section and the flow control member may be configured such that the fluid line section has a first cross section when or as long as the clutch actuation piston is disposed at a distance from the clutch pack, and that the fluid line section has a second cross section when or once the clutch actuation piston contacts the clutch pack or at least partially compresses the clutch pack including the friction plates as it moves in the engagement direction, wherein the second cross section is smaller than the first cross section. This allows fluid to enter the clutch chamber and to push the clutch actuation piston toward the clutch pack at a first rate before the clutch actuation piston contacts the clutch pack, and further allows fluid to enter the clutch chamber and to push the clutch actuation piston toward the clutch pack at a second rate once the clutch actuation piston contacts the clutch pack, wherein the first rate is faster than the second rate. This facilitates a fast and efficient yet smooth engagement of the wet clutch assembly.

The cross section of the fluid line section may have a non-zero minimum value. That is, preferably fluid may flow into and/or out of the clutch chamber irrespective of a position of the clutch actuation piston relative to the clutch drum. In particular, the flow control member and the fluid line may be configured such that the cross section of said fluid line section takes on its minimum non-zero value when or once the clutch actuation piston contacts the clutch pack. As explained above, this may facilitate a particularly efficient and smooth engagement of the wet clutch assembly.

The wet clutch assembly may comprise a first biasing member configured to bias the clutch actuation piston in a disengagement direction opposite the engagement direction only when or only once the clutch actuation piston at least partially compresses or fully compresses the clutch pack including the friction plates. The first biasing member may include one or more elastic members such as one or more springs. For example, the first biasing member may include one or more disc springs. Usually, a disc spring is formed of an annular disc having a conical shape. The first biasing member may be supported by the clutch drum. Typically, the first biasing member is disposed on a side of the clutch pack averted from the clutch actuation piston. Or, in other words, along a direction of movement of the clutch actuation piston the clutch pack may be disposed in between the clutch actuation piston and the first biasing member. A stiffness of the first biasing member then determines the force required to fully compress the clutch pack.

Additionally or alternatively, the wet clutch assembly may comprise a second biasing member, e.g. a piston return spring, the second biasing member biasing the clutch actuation piston in a disengagement direction opposite the engagement direction. In other words, the second biasing member may bias the wet clutch assembly toward the disengaged state. Preferably, the second biasing member biases the clutch actuation piston in the disengagement direction irrespective of a position of the clutch actuation piston relative to the clutch drum. The second biasing member may likewise be supported by the clutch drum.

The flow control member may be rigidly coupled to or integrally formed with the clutch actuation piston. For example, the first fluid line section extending through the clutch actuation piston may be in fluid communication or selectively in fluid communication with the second fluid line section extending through the first shaft or drum shaft via one of a first fluid port and a second fluid port, wherein a cross section of the first fluid port is larger than a cross section of the second fluid port, and wherein the cross section of the second fluid port is smaller than a cross section of the second fluid line section. The clutch actuation piston, the first fluid line section and the second fluid line section may then be configured such that when the clutch actuation piston is disposed at a distance from the clutch pack the first fluid line section is in fluid communication with the second fluid line section via the first fluid port, and such that when or once the clutch actuation piston contacts the clutch pack the first fluid line section is in fluid communication with the second fluid line section via the second fluid port.

Alternatively, the flow control member may comprise a plunger which is movable relative to the clutch actuation piston. In particular, the plunger may be movable relative to the clutch actuation piston and relative to the clutch drum. For example, the axis of movement of the clutch actuation piston relative to the clutch drum and an axis of movement of the plunger relative to the clutch actuation piston may be aligned in parallel. Such an arrangement may facilitate coupling between the movement of the plunger relative to the clutch actuation piston and the movement of the clutch actuation piston relative to the clutch drum.

The plunger and the first fluid line section extending through the clutch actuation piston may be configured such that a hydraulic pressure within the fluid line biases the plunger away from a position of the plunger relative to the clutch actuation piston in which the cross section of the first fluid line section has a non-zero minimum value. This allows fluid to fluid through the fluid line at a maximum rate at a given position of the clutch actuation piston relative to the clutch drum.

Additionally or alternatively, the clutch actuation piston may form a mechanical stop restricting movement of the plunger relative to the clutch actuation piston. Specifically, the mechanical stop may restrict movement of the plunger in the disengagement direction. In particular, the plunger and the first fluid line section extending through the clutch actuation piston may be configured such that the first fluid line section has a minimum value, in particular a non-zero minimum value, when the plunger is in contact with said mechanical stop. The plunger may be configured to protrude over a side of the clutch actuation piston facing the clutch pack, such that when the plunger protrudes over the side of the clutch actuation piston facing the clutch pack and the plunger contacts the clutch pack, movement of the clutch actuation piston toward the clutch pack results in or is configured to result in the clutch pack pushing the plunger toward the mechanical stop formed by the clutch actuation piston. For example, the clutch actuation piston may comprise a cavity and the plunger may be at least partially received in the cavity and may be movable within the cavity formed by the clutch actuation piston.

Preferably, the plunger and the first fluid line section extending through the clutch actuation piston are configured such that movement of the plunger toward the mechanical stop formed by the clutch actuation piston results in a monotonous reduction or in a strictly monotonous reduction of the cross section of the first fluid line section.

The plunger may comprise a fluid channel extending through the plunger. In particular, a cross section of said fluid channel extending through the plunger may define the non-zero minimum cross section of the first fluid line section when the plunger is in contact with the mechanical stop formed by the clutch actuation piston.

In order to facilitate draining of the clutch chamber, the clutch actuation piston may comprise a one-way valve, wherein the one-way valve provides selective fluid communication between the fluid line and the clutch chamber, in particular between the first fluid line section extending through the clutch actuation piston and the clutch chamber. In particular, the one-way valve may be configured to allow a flow of fluid through the one-way valve from the clutch chamber to the fluid line, and to block a flow of fluid through the one-way valve from the fluid line to the clutch chamber. In this way, the one-way valve may be configured to automatically close during the filling of the clutch chamber, and the one-way valve may be configured to automatically open during the draining or de-filling of the clutch chamber.

BRIEF DESCRIPTION OF THE DRAWINGS

Embodiments of the proposed wet clutch assembly are described by way of example in the following detailed description and in the accompanying drawing in which.

DETAILED DESCRIPTION

Figure 1A:
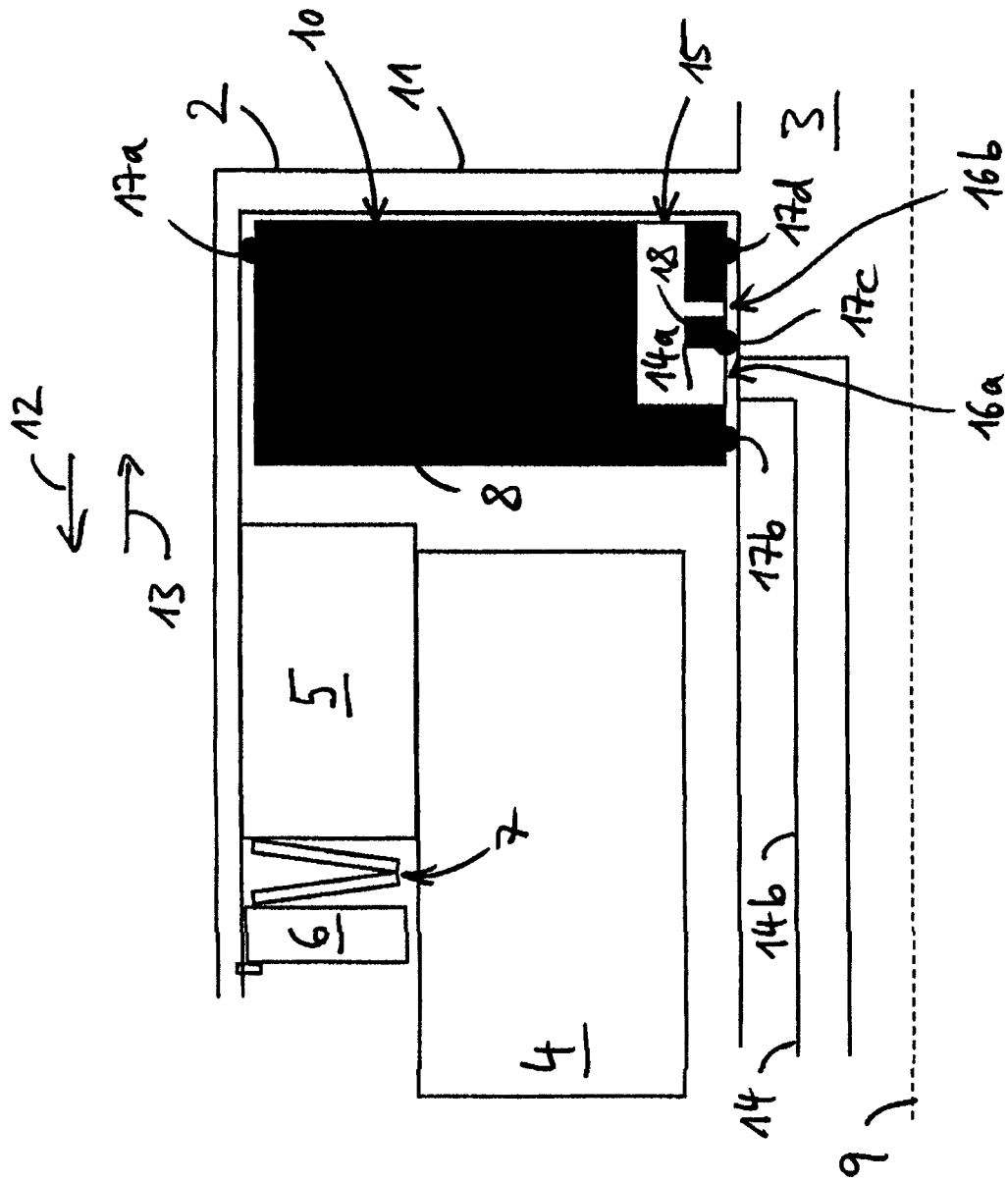
FIG. 1a schematically depicts a detail of a first embodiment of a wet clutch assembly according to a first configuration during a filling phase.
Figure 1B:
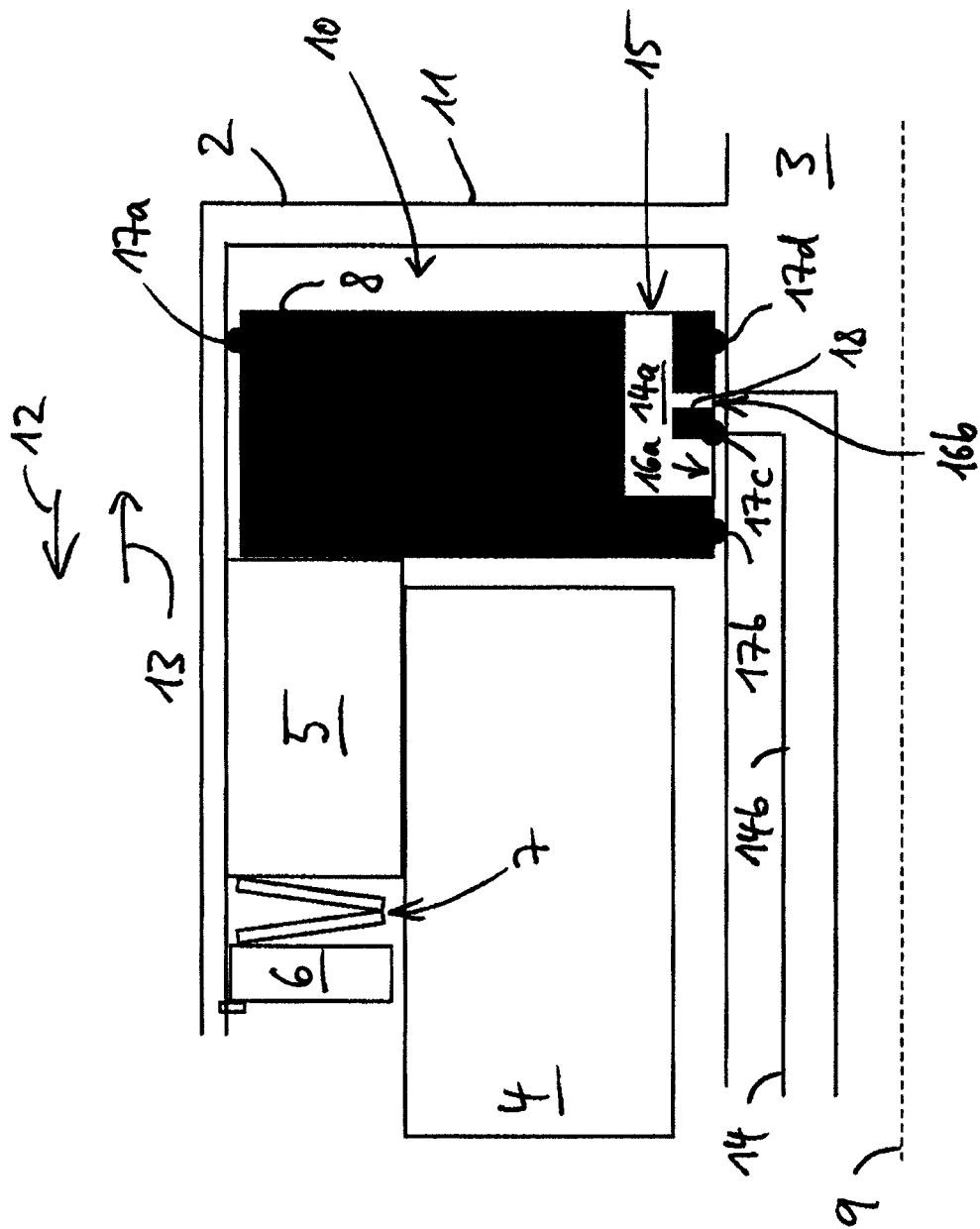
FIG. 1b shows the wet clutch assembly of FIG. 1a according to a second configuration during the filling phase.
Figure 1C:
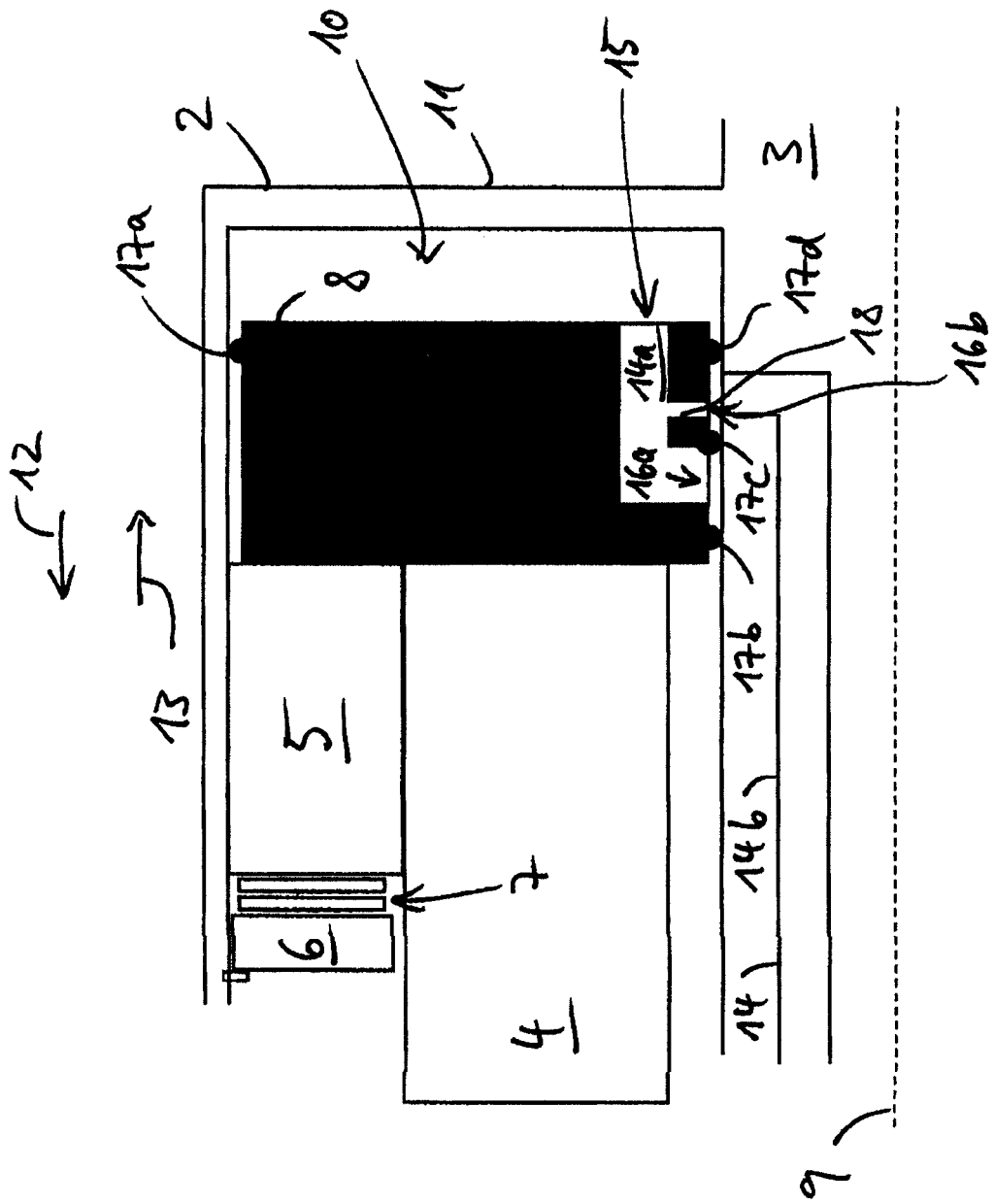
FIG. 1c shows the wet clutch assembly of FIGS. 1a-b according to a third configuration during the filling phase.

FIGS. 1a-c schematically depict a detail of a wet clutch assembly 1 in accordance with the invention. More specifically, FIGS. 1a-c depict different configurations of the wet clutch assembly 1 during a filling phase. The assembly 1 may find application in a transmission of an automotive vehicle, in particular in a transmission of an off-highway vehicle such as a mining vehicle, an earth moving machine, a material handling vehicle or an agricultural vehicle, for example. Here and in the following recurring features are designated by the same reference signs.

The wet clutch assembly 1 comprises a clutch drum 2, a first shaft 3 (also termed drum shaft), a second shaft 4 (also termed clutch gear), a clutch pack 5, an end plate 6, a first biasing member 7, and a clutch actuation piston 8 movably disposed within the clutch drum 2. The assembly 1 may be arranged symmetrically or essentially symmetrically with respect to a clutch axis 9. That is, FIGS. 1a-c show only a detail of the wet clutch assembly 1. The clutch axis 9 may be an axis of rotation of the assembly 1.

The clutch drum 2 may be a hollow cylindrical or essentially cylindrical member. The first shaft 3 and the second shaft 4 may each be formed as an elongate member. And the piston 8 may be an essentially cylindrical or disc-like member. Each of the clutch drum 2, the first shaft 3, the second shaft 4 and the piston 8 may be made of a rigid material such as steel. However, it is understood that the clutch drum 2, the first shaft 3, the second shaft 4 and the piston 8 may each be made of or may each comprise other materials.

The clutch drum 2 is integrally formed with or rigidly coupled to the first shaft 3 such that the clutch drum 2 and the first shaft 3 rotate together with respect to the clutch axis 9. Furthermore, the clutch drum 2 encloses a clutch chamber 10 configured to receive a clutch fluid such as oil. The clutch chamber 10 is formed in between a back wall 11 of the clutch drum 2 and the piston 8. The clutch chamber 10 and the piston 8 are configured such that the piston 8 may be actuated by means of a hydraulic pressure in the clutch chamber 10. The piston 8 is in sliding sealing engagement with an inner wall of the clutch drum 2 and with the first shaft 3 through elastic sealing means 17a-d. The sealing means 17a-d may comprise a rubber material, for example.

The second shaft 4 may likewise be an elongate member made of a rigid material such as steel. However, it is understood that the second shaft 4 may be made of or may comprise other materials. The second shaft 4 is at least partially received in within the clutch drum 2. The clutch drum 2 and the second shaft 4 are configured to be selectively rotationally locked to one another by means of the piston 8 and the clutch pack 5. Clutch packs such as the clutch pack 5 are generally known in the art of automotive transmissions.

For example, the clutch pack 5 may comprise a plurality of first and second friction plates (not shown). The first friction plates may be rotationally locked to the clutch drum 2 such that the first friction plates and the clutch drum 2 rotate together with respect to the clutch axis 9, and the second friction plates may be rotationally locked to the second shaft 4 such that the second friction plates and the second shaft 4 rotate together with respect to the axis 9. The first friction plates may be slidably coupled to the clutch drum 2 such that the first friction plates may move relative to the clutch drum 2 in a direction parallel to the clutch axis 9, and the second friction plates may be slidably coupled to the second shaft 4 such that the second friction plates may move relative to the second shaft 4 in a direction parallel to the clutch axis 9.

Furthermore, the first friction plates and the second friction plates may be arranged alternately such that each of the first friction plates is arranged in between two of the second friction plates, and such that each of the second friction plates is arranged in between two of the first friction plates.

The clutch drum 2 and the first shaft 3 on one hand and the second shaft 4 on the other hand may be rotationally locked to one another by frictionally engaging the first friction plates and the second friction plates of the clutch pack 5. To that end, the piston 8 may be moved in an engagement direction 12 parallel to the clutch axis 9 to compress the friction plates of the clutch pack 5 and to press the clutch pack 5 against the end plate 6. The end plate is rigidly connected to or integrally formed with the clutch drum 2. In other words, the piston 8 may transfer the wet clutch assembly 1 from a disengaged state in which the clutch drum 2 and the second shaft 4 are free to rotate relative to one another to an engaged state in which the clutch drum 2 and the second shaft 4 are rotationally locked and rotate together with respect to the clutch axis 9.

The force which the piston 8 needs to exert on the clutch pack 5 in order to fully compress the clutch pack 5 is determined by a stiffness of the first biasing member 7. The first biasing member 7 is disposed in between the end plate 6 and the clutch pack 5. The first biasing member 7 is supported by the clutch drum 2. The first biasing member 7 is disposed on a side of the clutch pack 5 averted from the piston 8. The first biasing member 7 may include one or more elastic members, for example one or more springs. In particular, the first biasing member 7 may include one or more disc springs. Here, the first biasing member 7 is configured to counteract a movement of the piston 8 in the engagement direction 12 only once the piston 8 contacts the clutch pack 5 or only once the piston 8 at least partially compresses the clutch pack 5 including the first and the second friction plates. The first biasing member 7 may be configured to disengage the first and the second friction plates of the clutch pack 5 from one another when or as soon as the piston 8 does not exert an engagement force on the clutch pack 5.

The assembly 1 may further comprise a second biasing member (not shown) configured to bias the piston 8 in a disengagement direction 13 parallel to the clutch axis 9 and opposite the engagement direction 12. The second biasing member may include one or more elastic members such as one or more springs. The second biasing member may be supported by the clutch drum 2. The second biasing member may force the piston 8 toward the back wall 11 of the clutch drum 2 when the hydraulic pressure in the clutch chamber 10 is or falls below a threshold pressure.

The assembly 1 comprises a fluid line 14 which fluidly connects the clutch chamber 10 with a fluid reservoir (not shown). That is, clutch fluid from the fluid reservoir may be provided to the clutch chamber 10 via the fluid line 14 for filling the clutch chamber 10 and for actuating the piston 8, for example by means of a pressurizing device such as a fluid pump or a hydraulic cylinder. Conversely, the clutch chamber 10 may be drained via the same fluid line 14. The fluid line 14 comprises a first fluid line section 14a and a second fluid line section 14b.

The first fluid line section 14a extends through the piston 8. For example, the first fluid line section 14a may be configured as a boring in the piston 8. A first end 15 of the first fluid line section 14a ends at a side of the piston 8 averted from the clutch pack 5 and facing the back wall 11 of the clutch drum 2. A second end 16 of the first fluid line section 14a is formed by two fluid ports 16a, 16b. The fluid ports 16a, 16b of the first fluid line section 14a are formed at a side of the piston 8 facing the first shaft 3. By contrast, the second fluid line section 14b extends through the first shaft 3 and ends at a side of the first shaft 3 facing the piston 8.

Depending on a position of the piston 8 relative to the clutch drum 2 and relative to the first shaft 3, the first fluid line section 14a is in fluid communication with the second fluid line section 14b via the first fluid port 16a and a first feed through formed by the sealing means 17b, 17c, as shown in FIG. 1a, or via the second fluid port 16b and a second feed through formed by the sealing means 17c, 17d, as shown in FIGS. 1b and 1c. Importantly, the first fluid port 16a has a first non-zero cross section and the second fluid port 16b has a second non-zero cross section, wherein the first cross section is larger than the second cross section. That is, when the fluid line sections 14a, 14b are in fluid communication with one another via the first fluid port 16a, the clutch chamber 10 may be filled at a faster rate than when the fluid line sections 14a, 14b are in fluid communication with one another via the second fluid port 16b.

In the first configuration of the wet clutch assembly 1 depicted in FIG. 1a the assembly 1 is in the disengaged state, i.e. friction plates of the clutch pack 5 are disengaged from one another and the clutch drum 2 and the second shaft 4 are free to rotate relative to one another. No torque is transmitted from the clutch drum 2 to the second shaft 4 or vice versa. There is no fluid or essentially no fluid in the clutch chamber 10 and the above-described second biasing member (not shown) biases the piston 8 toward the back wall 11 of the clutch drum 2. The piston 8 is disposed at a distance from the clutch pack 5 such that the piston 8 does not touch the clutch pack 5 and exerts no engagement force on the friction plates of the clutch pack 5. In this first configuration the clutch chamber 10 is in fluid communication with the fluid reservoir via the first fluid port 16a having the larger cross section. Thus, in the first configuration shown in FIG. 1a fluid from the fluid reservoir may be pumped into the clutch chamber 10 at a fast rate. Thus, before the piston 8 contacts the clutch pack 5 and before torque can be transmitted through the assembly 1 the piston 8 may be moved in the engagement direction 12 at a fast rate, thereby facilitating an efficient shift.

In the second configuration of the wet clutch assembly 1 depicted in FIG. 1b the clutch chamber 10 has been partially filled via the fluid line 14. The hydraulic pressure in the clutch chamber 10 has moved the piston 8 further in the engagement direction 12 against the counteracting force of the second biasing member (not shown). The piston 8 now contacts the clutch pack 5 and starts compressing the clutch pack 5.

In FIG. 1b the clutch chamber 10 is in fluid communication with the fluid reservoir via the second fluid port 16b having the smaller cross section. Specifically, a portion 18 of the clutch actuation 8 disposed in between the first fluid port 16a and the second fluid port 16b partially blocks the fluid line 14, thereby functioning as a flow control member. The portion 18 is integrally formed with the piston 8 and is movable relative to the second section 14b of the fluid line 14. The portion 18 is configured to vary the cross section of the fluid line 14 through movement of the piston 8 relative to the clutch drum 2. Thus, in the second configuration shown in FIG. 1b fluid from the fluid reservoir may be pumped into the clutch chamber 10 only at a slow rate, resulting in a slow movement of the piston 8 in the engagement direction 12 and in a slow and smooth engagement of the friction plates of the clutch pack 5.

In the third configuration of the wet clutch assembly 1 depicted in FIG. 1c the clutch chamber 10 has been completely filled and the hydraulic pressure in the clutch chamber 10 has moved the piston 8 further in the engagement direction 12 against the counteracting force of the first biasing member 7 and of the second biasing member (not shown). The piston 8 now completely compresses the clutch pack 5 and the first biasing member 7 and presses the clutch pack 5 and the first biasing member 7 against the end plate 6. Thereby, the clutch pack 5 rotationally locks the second shaft 4 to the clutch drum 2 such that second shaft 4 and the clutch drum 2 rotate together with respect to the clutch axis 9. The assembly 1 is in the engaged state.

In this third configuration the clutch chamber 10 continues to be in fluid communication with the fluid reservoir via the second fluid port 16b having the smaller cross section. FIGS. 1a-c clearly show that the cross section of the second fluid port 16b is smaller than the cross section of the second fluid line section 14b. Moreover, it can be appreciated from FIGS. 1a-c that the piston 8, the second fluid port 16b, the second fluid line section 14b, the clutch pack 5 and the end plate 6 are configured such that as the piston 8 is moved in the engagement direction 12 from the position depicted in FIG. 2b in which the piston 8 just contacts the clutch pack 5 to the position depicted in FIG. 2c in which the piston 8 fully compresses the clutch pack 5, the cross section of the fluid line 14 continues to be defined by the smaller cross section of the second fluid port 16b.

From the engaged state shown in FIG. 1c is the assembly 1 may be transferred back to the disengaged state shown in FIG. 1b or 1a by draining the clutch chamber 10 via the fluid line 14. As fluid flows out of the clutch chamber 10 via the fluid line 14 and the hydraulic pressure in the clutch chamber 10 decreases, the first biasing member 7 and/or the second biasing member (not shown) push the piston 8 in the disengagement direction 13 and toward the back wall 11 of the clutch drum 2 such that the friction plates of the clutch pack 5 are disengaged.

Figure 2A:
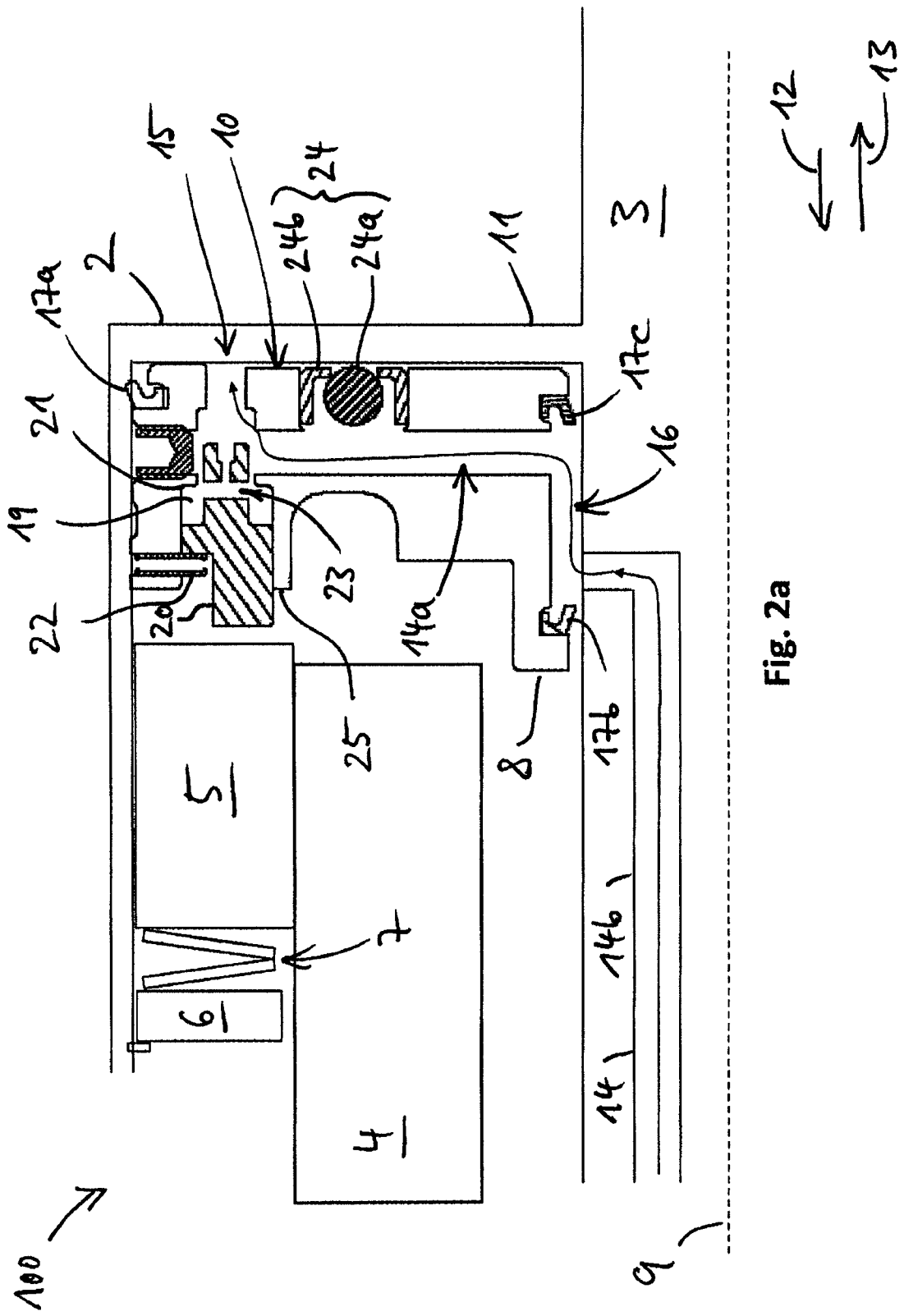
FIG. 2a schematically depicts a detail of a second embodiment of a wet clutch assembly according to a first configuration during a filling phase.
Figure 2B:
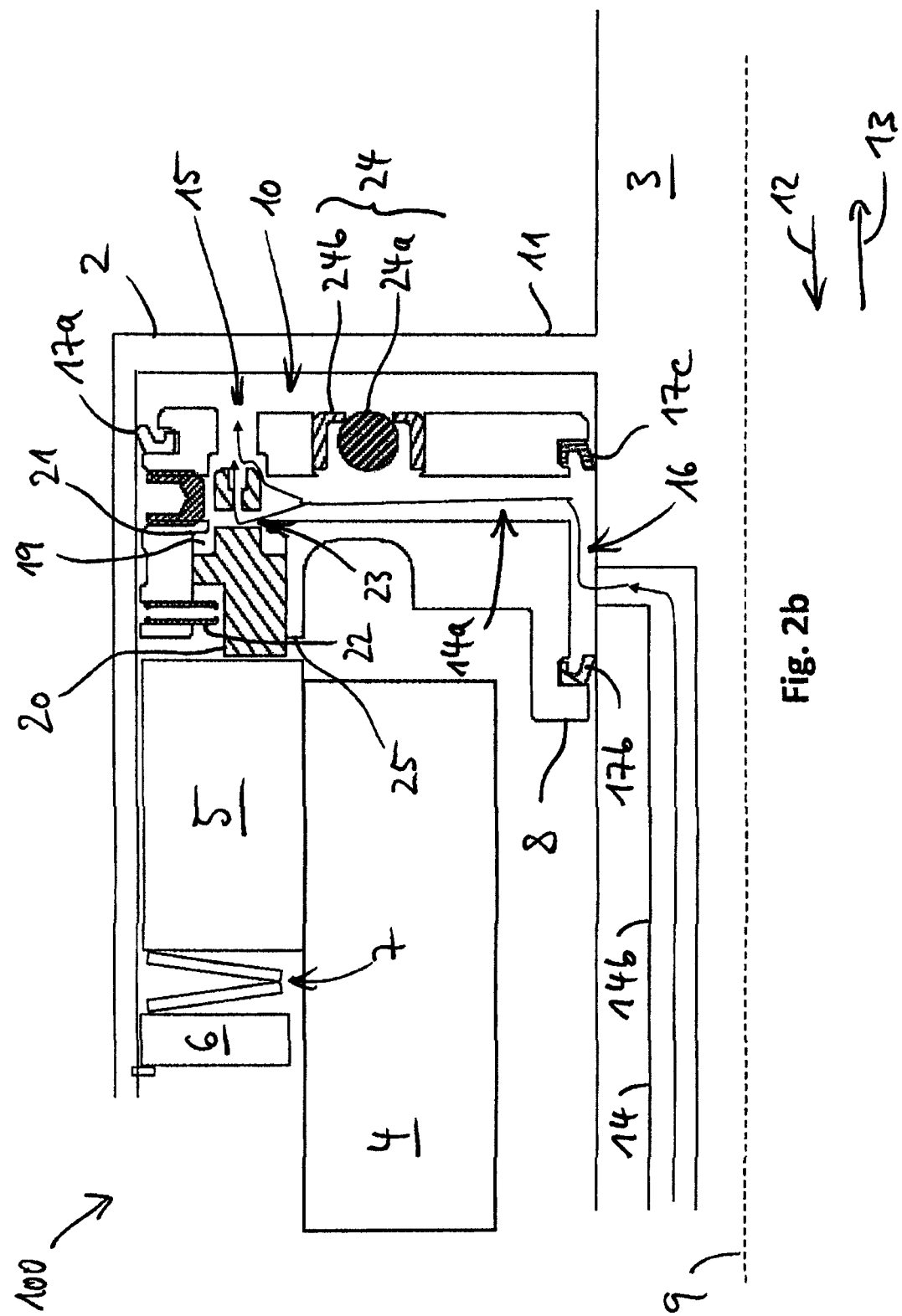
FIG. 2b shows the wet clutch assembly of FIG. 2a according to a second configuration during the filling phase.
Figure 2C:
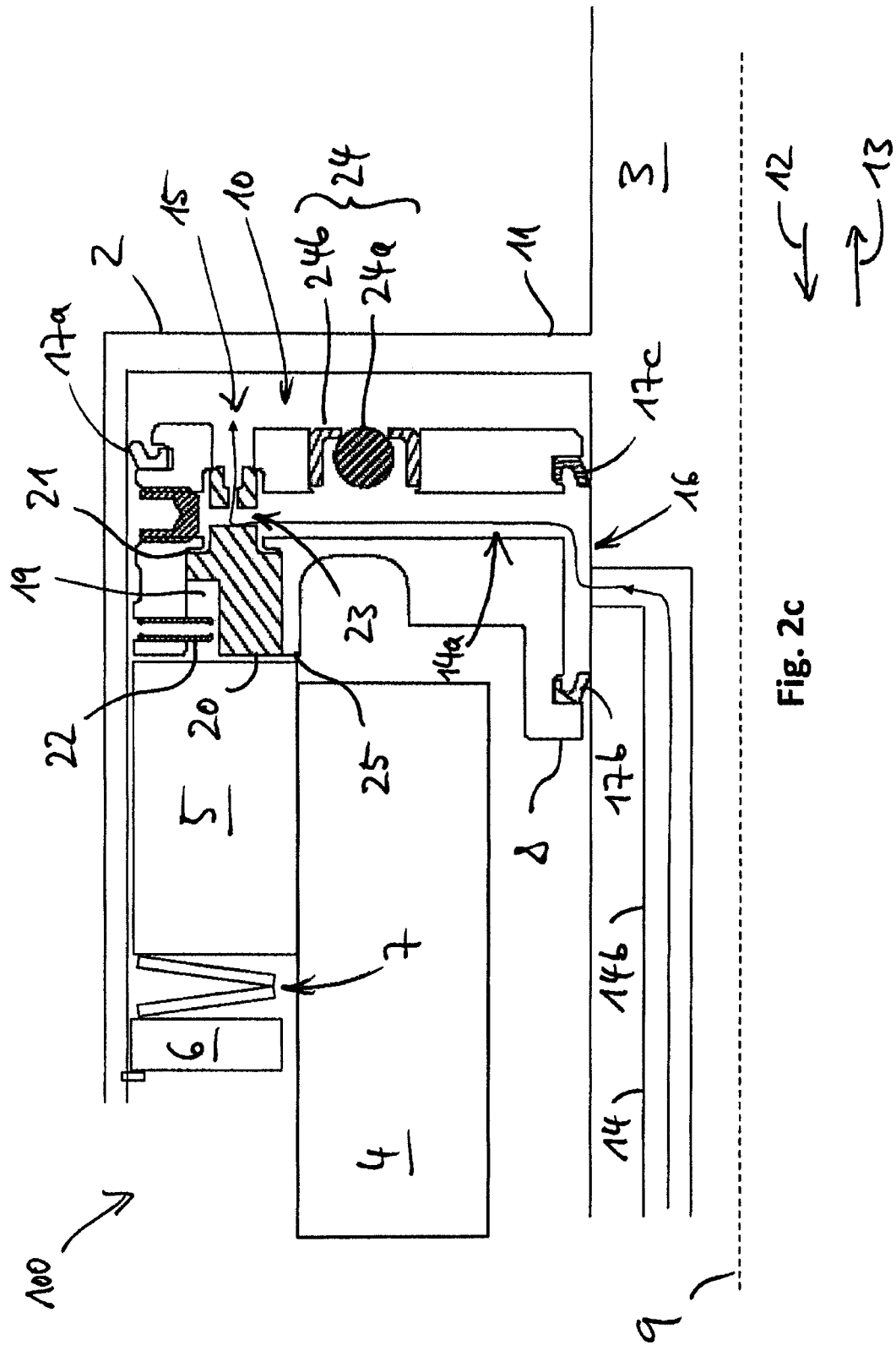
FIG. 2c shows the wet clutch assembly of FIGS. 2a-b according to a third configuration during the filling phase.
Figure 2D:
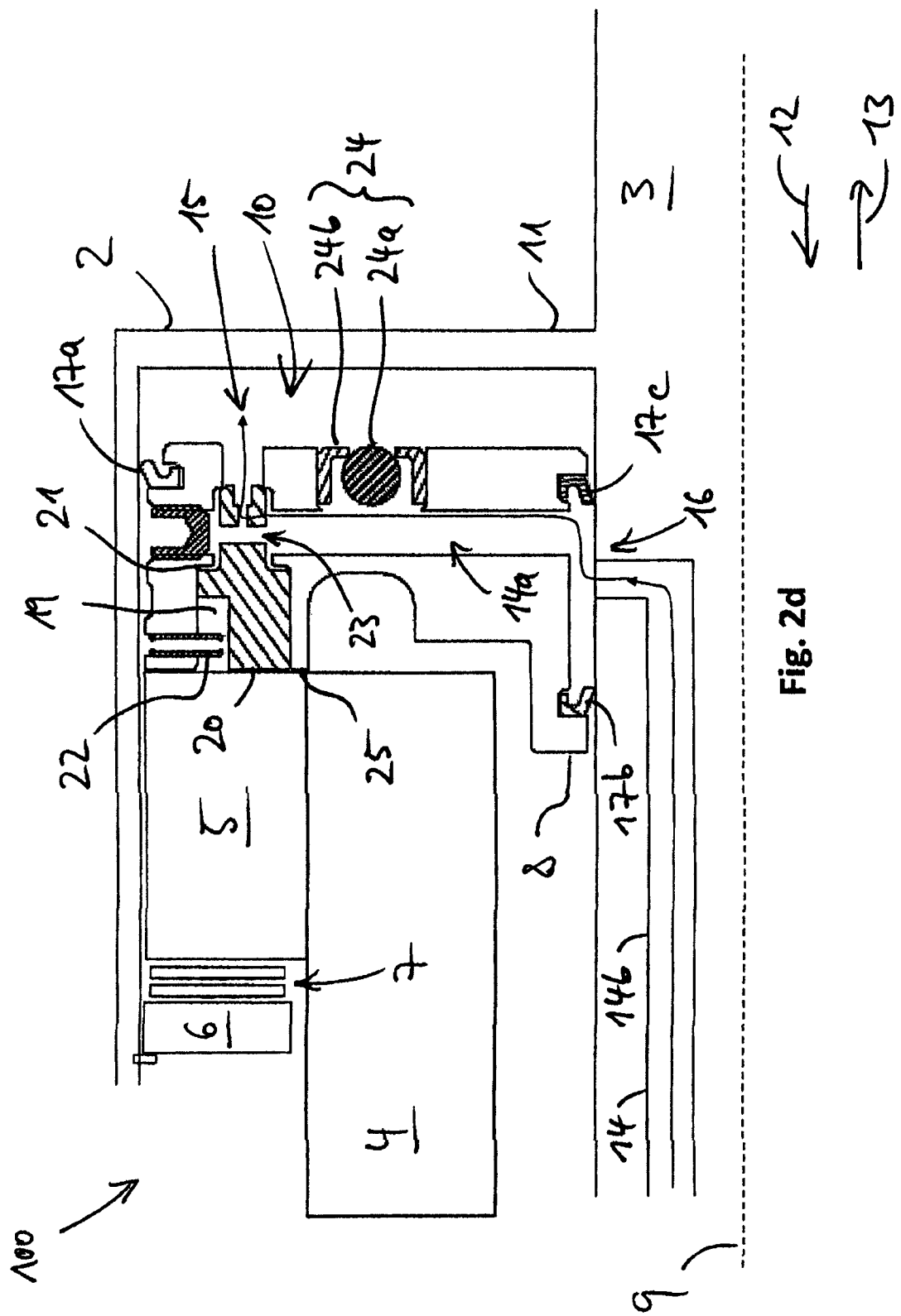
FIG. 2d shows the wet clutch assembly of FIGS. 2a-c according to a fourth configuration during a modulation phase.
Figure 2E:
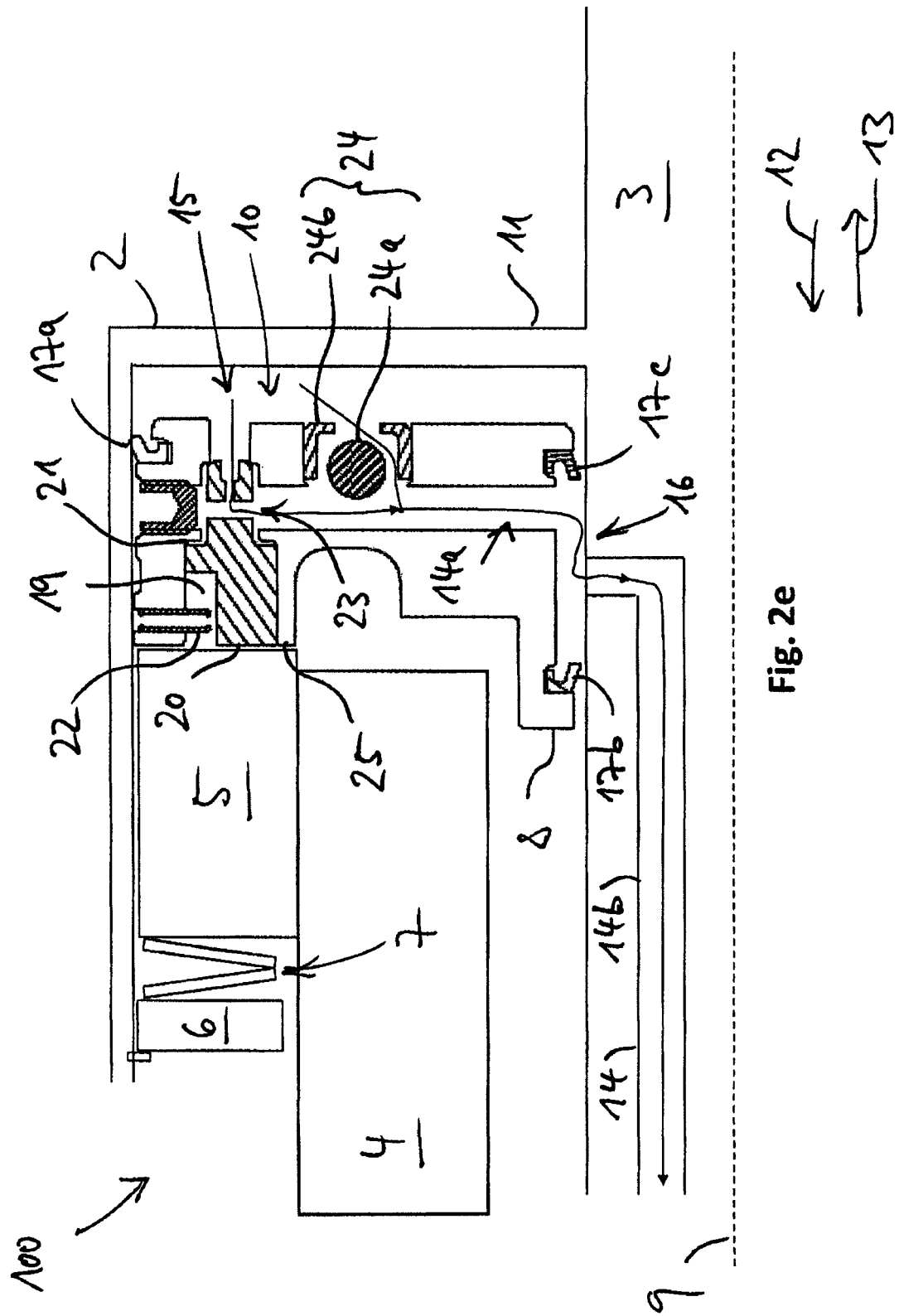
FIG. 2e shows the wet clutch assembly of FIGS. 2a-d according to a first configuration during a draining phase.

FIGS. 2a-e schematically depict a detail of a further wet clutch assembly 100 in accordance with the invention. More specifically, FIGS. 2a-d depict different configurations of the wet clutch assembly 100 during a filling phase, and FIG. 2e depicts a configuration of the wet clutch assembly 100 during a draining phase. As before, recurring features are designated by the same reference signs. In particular, features in FIGS. 2a-e which are designated by the same reference signs as corresponding features in FIGS. 1a-c are configured in the same manner as described above with reference to FIGS. 1a-c. For brevity, these features are not again described in detail.

The clutch assembly 100 depicted in FIGS. 2a-e comprises a clutch drum 2, a first shaft 3 (also termed drum shaft), a second shaft 4 (also termed clutch gear), a clutch pack 5, an end plate 6, a first biasing member 7, and a clutch actuation piston 8. The first shaft 3 is rigidly coupled to or integrally formed with the clutch drum 2. The clutch pack 5 includes a plurality of friction plates and is configured to selectively rotationally lock the second shaft 4 to the clutch drum 2. The endplate 6 is rigidly coupled to the clutch drum 2. The first biasing member 7 includes one or more elastic members such as one or more springs, in particular one or more disc springs, and is disposed in between the endplate 6 and the clutch pack 5. The piston 8 is movably disposed within the clutch drum 2. The piston 8 is in sliding sealing engagement with an inner wall of the clutch drum 2 and with the first shaft 3 via sealing means 17a-c. The sealing means 17a-c are mounted on the piston 8.

The piston 8 is configured to be actuated by means of a hydraulic pressure in a clutch chamber 10. The clutch chamber 10 is formed by the clutch drum 2 in between the piston 8 and a back wall 11 of the clutch drum 2. The clutch chamber 10 may be filled and drained via a fluid line 14.

That is, clutch fluid such as oil may flow into the clutch chamber 10 via the fluid line 14, and the clutch chamber 10 may be drained via the same fluid line 14. The fluid line 14 comprises a first fluid line section 14a extending through the piston 8, and a second fluid line section 14b extending through the first shaft 3. A first end 15 of the first fluid line section 14a ends at a side of the piston 8 averted from the clutch pack 5 and facing the back wall 11 of the clutch drum 2. A second end 16 of the first fluid line section 14a is formed by a fluid port 16. The fluid line sections 14a, 14b are in fluid communication with one another via a feed-through formed by the elastic sealing means 17a, 17b.

The piston 8 further comprises a one-way valve 24 disposed at an end of the piston 8 facing the clutch chamber 10. The one-way valve 24 provides selective fluid communication between the first fluid line section 14a and the clutch chamber 10. Here, the one-way valve 24 is configured as a ball valve comprising a ball 24a and a valve seat 24b for receiving the ball 24a. The one-way valve 24 allows a flow of fluid through the one-way valve 24 from the clutch chamber 10 to the first fluid line section 14a and blocks a flow of fluid through the one-way valve 24 from the first fluid line section 14a to the clutch chamber 10. The one-way valve 24 facilitates draining of the clutch chamber 10, as will be explained in more detail with respect to FIG. 2e.

The assembly 100 may be symmetric or essentially symmetric with respect to the clutch axis 9. The clutch drum 2, the first shaft 3 and the second shaft 4 may be configured to rotate with respect to the clutch axis 9. The assembly 100 may be transferred from a disengaged state depicted in FIGS. 2a-c to an engaged state depicted in FIG. 2d through movement of the piston 8 in the engagement direction 12 parallel to the clutch axis 9. Conversely, through movement of the piston 8 in the disengagement direction 13 opposite the engagement direction 12 the assembly 100 may be transferred from the engaged state back to the disengaged state. In addition or as an alternative to the first biasing member 7, the assembly 100 may comprise a second biasing member (not shown) for biasing the piston 8 in the disengagement direction 13, preferably independently of a position of the piston 8 relative to the clutch drum 2. The second biasing member may comprise one or more elastic members such as one or more springs, for example. The second biasing member may be supported by the clutch drum 2.

The piston 8 depicted in FIGS. 2a-e comprises a cavity 19. The cavity 19 extends through the piston 8 along the direction of movement of the piston 8 relative to the clutch drum 2, i.e. parallel to the clutch axis 9. The cavity 19 is in fluid communication with the first fluid line section 14a.

A plunger 20 is at least partially received in the cavity 19 formed by the piston 8. The plunger 20 is made of a rigid material such as steel. However, it is understood that the plunger 20 may be made of or may comprise other materials. The plunger 20 is movable relative to the piston 8 and is movably disposed within the cavity 19. Specifically, an axis of movement of the plunger 20 relative to the piston 8 is aligned in parallel to the axis of movement of the piston 8 relative to the clutch drum 2, i.e. in parallel to the clutch axis 9. Movement of the plunger 20 relative to the piston 8 in the disengagement direction 13 is restricted by a first mechanical stop 21, and movement of the plunger 20 relative to the piston 8 in the engagement direction 12 is restricted by a second mechanical stop 22. Here, the mechanical stops 21, 22 are integrally formed with the piston 8.

A position of the plunger 20 relative to the piston 8 determines a cross section of the first fluid line section 14a. That is, the position of the plunger 20 relative to the piston 8 influences or restricts the rate at which fluid may flow into or out of the clutch chamber 10 so that the plunger 20 functions as a flow control member. In this way, the plunger determines the rate or speed at which the piston 8 moves relative to the clutch drum 2.

Specifically, the cross section of the first fluid line section 14a may have a minimum non-zero value when the plunger 20 is in a first position relative to the piston 8 in which a portion of the plunger 20 is in contact with the first mechanical stop 21, as shown in FIGS. 2c and 2d. And the cross section of the first fluid line section 14a may have a maximum value when the plunger 20 is in a second position relative to the piston 8 in which a portion of the plunger 20 is in contact with the second mechanical stop 22, as shown in FIG. 2a. In particular, the plunger 20 and the first fluid line section 14a may be configured such that the cross section of the first fluid line section 14a is reduced monotonically or strictly monotonically as the plunger 20 moves from its second position (FIG. 2a) to its first position (FIGS. 2c and 2d). The plunger 20 comprises a fluid channel 23 extending through the plunger. The function of the fluid channel 23 will be described further below with respect to FIG. 2e.

In the following, the process of filling the clutch chamber 10 and of engaging the wet clutch assembly 100 is briefly described with respect to FIGS. 2a-d. The process of draining the clutch chamber 10 and of disengaging the wet clutch assembly 100 is briefly described with respect to FIG. 2e.

In the first configuration of the assembly 100 shown in FIG. 2a the clutch chamber 10 formed by the clutch drum 2 is void of fluid or essentially void of fluid. The friction plates of the clutch pack 5 are disengaged and the first biasing member 7 is in a de-compressed state. The clutch drum 2 and the second shaft 4 are free to rotate relative to one another. The above-described second biasing member (not shown) forces the piston 8 in the disengagement direction 13. The piston 8 is disposed at a distance from the clutch pack 5 and exerts no engagement force on the clutch pack 5. A fluid pump (not shown) pumps fluid at high pressure through the fluid line 14 and into the clutch chamber 10 for filling the clutch chamber 10 and for moving the piston 8 in the engagement direction 12 and toward the clutch pack 5. The second fluid line section 14b is in fluid communication with the clutch chamber 10 via the first fluid line section 14a extending through the piston 8.

In the first configuration depicted in FIG. 2a the fluid pressure in the first fluid line section 14a forces the plunger 20 in the engagement direction 12 and toward the clutch pack 5 so that the plunger 20 contacts the second mechanical stop 22. In this position the plunger 20 protrudes over a side 25 of the piston 8 facing the clutch pack 5. However, the plunger 20 is still disposed at a distance from the clutch pack 5 and is not in contact with the clutch pack 5. The cross section of the first fluid line section 14a takes on its maximum value, thereby allowing fluid to enter the clutch chamber 10 at a fast rate. The fluid pressure in the first fluid line section 14a forces the ball 24a of the one-way valve 24 into its seat 24b, thereby closing the one-way valve 24 and blocking a flow of fluid through the one-way valve 24.

In the second configuration of the assembly 100 depicted in FIG. 2b the clutch chamber 10 has been partially filled and the piston 8 has been partially moved in the engagement direction 12 and toward the clutch pack 5. The piston 8 is still disposed at a distance from the clutch pack 5 and exerts no engagement force on the clutch pack 5. However, the plunger 20 now contacts the clutch pack 5. Due to the movement of the piston 8 in the engagement direction 12 and toward the clutch pack 5, the clutch pack 5 has partially pushed the plunger 20 into the cavity 19 of the piston 8 and toward the first mechanical stop 21. The plunger 20 is no longer in contact with the second mechanical stop 22. In this position of the plunger 20 relative to the piston 8 the plunger 20 partially closes the first fluid line section 14a. In the second configuration depicted in FIG. 2b the cross section of the first fluid line section 14a is reduced with respect to the first configuration according to FIG. 2a. Fluid entering the clutch chamber 10 may now partially flow through the fluid channel 23 extending through the plunger 20. The fluid pressure in the first fluid line section 14a still forces the ball 24a of the one-way valve 24 into its seat 24b, thereby closing the one-way valve 24.

In the third configuration of the assembly 100 depicted in FIG. 2c more fluid has entered the clutch chamber 10 via the fluid line 14 and the piston 8 has been further moved in the engagement direction 12 and toward the clutch pack 5. The piston 8 now contacts the clutch pack 5 and is about to compress the clutch pack 5. As the piston 8 contacts the clutch pack 5, the clutch pack 5 pushes the plunger 20 all the way into the cavity 19 of the piston 8 so that the plunger 20 is forced against the first mechanical stop 21. In this position of the plunger 20 relative to the piston 8 the first mechanical stop 21 forms a valve seat for the plunger 20 so that no fluid may pass between the plunger 20 and the valve seat formed by the first mechanical stop 21.

However, fluid may still enter the clutch chamber 10 at a slow rate via the channel 23 extending through the plunger 20. That is, as the plunger 20 is forced against and contacts the first mechanical stop 21, a cross section of the fluid channel 23 defines the cross section of the first fluid line section 14a. In particular, the cross section of the fluid channel 23 defines the non-zero minimum cross section of the first fluid line section 14a. In other words, once the piston 8 contacts the clutch pack 5 further movement of the piston 8 in the engagement direction 12 and toward the clutch pack 5 is slowed down, thereby facilitating a smooth engagement of the assembly 100. Furthermore, in the third configuration shown in FIG. 2c the first biasing member 7 continues to be in the de-compressed state and the fluid pressure in the first fluid line section 14a continues to force the ball 24a of the one-way valve 24 into its seat 24b, thereby closing the one-way valve 24.

A skilled person may easily appreciate that the flow control mechanism realized by the assembly 100 automatically adapts to mechanical wear experienced by the friction plates of the clutch pack 5. For example, in most known wet clutch systems mechanical wear of the friction plates of the clutch pack 5 causes the extension of the clutch pack 5 and, concomitantly, the amount of fluid required to bring the piston 8 into contact with the clutch pack 5 to change over the lifetime of the clutch. As a result, shift quality may degrade over time or a frequent adjustment of the parameters determining the filling process is required. However, according to the present invention the amount of fluid entering the clutch chamber 10 is automatically reduced once the piston 8 contacts the clutch pack 5, independently of the geometry of the clutch pack 5 or the piston 8. Consequently, in the assembly 100 according to FIGS. 2a-e mechanical wear of the clutch pack 5 or of the piston 8 does not impair shift quality.

In the fourth configuration of the assembly 100 depicted in FIG. 2d the assembly 100 is in the engaged state. The clutch chamber 10 is completely filled and the piston 8 fully compresses the clutch pack 5 and the first biasing member 7, thereby pressing the clutch pack 5 and the biasing member against the endplate 6. The friction plates of the clutch pack 5 are fully engaged, thereby rotationally locking the second shaft 4 to the clutch drum 2 so that the second shaft 4 and the clutch drum 2 rotate together with respect to the clutch axis 9. The plunger 20 remains in contact with the valve seat defined by the first mechanical stop 21. The fluid pressure in the fluid line 14 keeps the one-way valve 24 shut, thereby blocking a flow of fluid through the one-way valve 24.

Starting from the fully engaged state of the assembly 100 depicted in FIG. 2d the assembly 100 may be disengaged by lowering the fluid pressure in the fluid line 14, for example by actively pumping fluid from the clutch chamber 10 toward the fluid reservoir. This process is depicted in FIG. 2e. In FIG. 2e the first biasing member 7 and the second biasing member (not shown) push the piston 8 in the disengagement direction 13 and toward the back plate 11 of the clutch drum 2, thereby increasing the hydraulic pressure in the clutch chamber 10 and forcing fluid out of the clutch chamber 10. As the hydraulic pressure in the clutch chamber 10 exceeds the hydraulic pressure in the fluid line 14, the ball 24a is forced out of its seat 24b, thereby opening the one-way valve 24. Fluid from the clutch chamber 10 may now pass both through the fluid channel 23 extending through the plunger 20 and through the one-way valve 24. In this way, the one-way valve 24 facilitates draining of the clutch chamber 10 and disengaging the assembly 100.

The invention claimed is:

1. A wet clutch assembly, comprising:
   a clutch drum;
   a clutch chamber formed within the clutch drum;
   a clutch actuation piston movably disposed within the clutch drum and configured to be actuated via a hydraulic pressure in the clutch chamber; and
   a fluid line at least partially extending through the clutch actuation piston, the fluid line providing fluid communication with the clutch chamber for filling the clutch chamber via the fluid line;
   a flow control member comprised of an axial boring in the clutch actuation piston and first and second radially extending fluid ports in the clutch actuation piston in fluid communication with the axial boring, wherein the first radially extending fluid port has a larger cross section than the second radially extending fluid port;
   wherein both of said first and second radially extending fluid ports open on a same outer wall of the clutch actuation piston and are adapted to be supplied by the same fluid line.

2. The wet clutch assembly according to claim 1, wherein said flow control member is movable relative to a section of the fluid line and configured to vary a cross section of said fluid line section through movement of the clutch actuation piston relative to the clutch drum.

3. The wet clutch assembly of claim 2, wherein the clutch actuation piston is configured to transfer the wet clutch assembly from a disengaged state to an engaged state through movement of the clutch actuation piston in an engagement direction relative to the clutch drum, wherein the flow control member is configured to reduce the cross section of said fluid line section through movement of the clutch actuation piston in the engagement direction.

4. The wet clutch assembly according to claim 3, wherein the cross section of said fluid line section has a non-zero minimum value.

5. The wet clutch assembly according to claim 4, further including a clutch pack comprising a plurality of friction plates, wherein the clutch actuation piston is configured to transfer the wet clutch assembly to the engaged state by forcing the friction plates into engagement, and wherein the flow control member and the fluid line are preferably configured such that the cross section of said fluid line section has the minimum value when or once the clutch actuation piston touches the clutch pack.

6. The wet clutch assembly according to claim 1, further comprising a clutch pack comprising a plurality of friction plates, wherein the clutch actuation piston is configured to transfer the wet clutch assembly to an engaged state by compressing the clutch pack including the friction plates and by forcing the friction plates into engagement, the wet clutch assembly further comprising a biasing member supported by the clutch drum, the biasing member configured to bias the clutch actuation piston in a disengagement direction only when or only once the clutch actuation piston compresses or at least partially compresses the clutch pack.

7. The wet clutch assembly according to claim 6, further comprising a clutch shaft rigidly coupled to or integrally formed with the clutch drum, wherein the fluid line extends partially through the clutch shaft and wherein the flow control member is rigidly coupled to or integrally formed with the clutch actuation piston.

8. A wet clutch assembly, comprising:
   a clutch drum;
   a clutch chamber formed within the clutch drum;
   a clutch actuation piston movably disposed within the clutch drum and configured to be actuated via a hydraulic pressure in the clutch chamber; and
   a fluid line at least partially extending through the clutch actuation piston, the fluid line providing fluid communication with the clutch chamber for filling the clutch chamber via the fluid line;
   a flow control member comprised of an axial boring in the clutch actuation piston and first and second radially extending fluid ports in the clutch actuation piston in fluid communication with the axial boring, wherein the first radially extending fluid port has a larger cross section than the second radially extending fluid port;
   wherein said flow control member is movable relative to a section of the fluid line and configured to vary a cross section of said fluid line section through movement of the clutch actuation piston relative to the clutch drum,
   wherein the clutch actuation piston is configured to transfer the wet clutch assembly from a disengaged state to an engaged state through movement of the clutch actuation piston in an engagement direction relative to the clutch drum, wherein the flow control member is configured to reduce the cross section of said fluid line section through movement of the clutch actuation piston in the engagement direction.

* * * * *